United States Patent [19]
Weil

[11] Patent Number: 5,147,596
[45] Date of Patent: Sep. 15, 1992

[54] TOPOLOGICALLY CONSTRAINED RELAXATION METHOD AND APPARATUS FOR PRODUCING REVERSED-FIELD PINCH WITH INNER DIVERTOR IN PLASMA CONFINEMENT

[75] Inventor: Daniel Weil, Jerusalem, Israel

[73] Assignee: Laboratory of Ionised Gases The Hebrew University of Jerusalem, Jerusalem, Israel

[21] Appl. No.: 489,074

[22] Filed: Mar. 7, 1990

[30] Foreign Application Priority Data

Mar. 7, 1989 [IL] Israel .................................. 89519

[51] Int. Cl.$^5$ .............................................. G21B 1/00
[52] U.S. Cl. .................................................... 376/134
[58] Field of Search ................ 376/134, 133, 142, 137, 376/138, 124, 123, 121

[56] References Cited

U.S. PATENT DOCUMENTS

| | | | |
|---|---|---|---|
| 3,692,626 | 9/1972 | Ohkawa | 376/133 |
| 4,149,931 | 4/1979 | Christensen | 376/134 |
| 4,302,284 | 11/1981 | Ohkawa | 376/133 |
| 4,543,231 | 9/1985 | Ohkawa | 376/133 |
| 4,560,528 | 12/1985 | Ohkawa | 376/133 |

OTHER PUBLICATIONS

Post et al, "Models for Poloidal Divertors", PPP2-1913, Jul. 1982.
Strait, "Exhaust Rate Measurements In A Divertor With Large Mirror Ratio", DOE/ET/53051-46, Aug. 1982.
Stott et al., "The Bundle Divertor", Nuclear Fusion, vol. 17, No. 3, Jul. 1977.
C. M. Bishop, "Stability of Localized MHD Modes in Divertor Tokamaks—A picture of the H-Mode", Nuclear Fusion, vol. 26, No. 8, Dec. 31, 1985.
T. H. Jensen and M. S. Chu, "The Bumpy Z-Pinch", J. Plasma Physics, vol. 25, Part 3, pp. 459–464, May 24, 1980.
D. Finkelstein and D. Weil "Magnetobhydrodynamic Kinks in Astrophysics", International Journal of Theoretical Physics, vol. 17, No. 3, pp. 201–217, May 2, 1978.

(List continued on next page.)

Primary Examiner—Daniel D. Wasil
Attorney, Agent, or Firm—Lowe, Price, LeBlanc & Becker

[57] ABSTRACT

A method and apparatus for plasma relaxation under magnetic global topological constraint produces a hot magnetically confined toroidal Z-pinch plasma with a plurality of straight and toroidal relaxing plasma discharges so as to generate at least one open-ended poloidal null separatrix in the magnetic field with one poloidal null within the plasma space situated in the small major radius side of the toroidal discharge, forming thereby a magnetic configuration (called DAG) with non-zero homotopic invariant, including a toroidal reversed-field pinch with inner poloidal divertor, in a region of open plasma magnetic surfaces surrounding the toroidal discharges, when toroidal magnetic field component is also made to be substantially different from zero at the poloidal null. The topologically constrained relaxation invention, called topomak, may be operated in equilibria with regions of nested closed magnetic surfaces of high magnetic shear with safety factor Q radially varying from negative, but greater than $-1$, values to $+$infinity, and with high plasma/magnetic pressures ratio, closed to known theoretical stability conditions, the topological invariant opposing plasma relaxation to less favorable lower-energy states without reversal. The toroidally reversed poloidal divertor is effectively produced in the topomak by replacing the solid conducting inner core of prior art reversed-field-pinch relaxation devices by straight-pinch-like current discharge of plasma along the major axis under conditions where the topological constraint holds. The DAG plasma configuration has cylindrical topology.

24 Claims, 4 Drawing Sheets

OTHER PUBLICATIONS

J. B. Taylor, "Relaxation of Toroidal Plasma and Generation of Reverse Magnetic Fields", Physical Review Letters, vol. 33, N. 19, pp. 1139–1141, Nov. 4, 1974.

H. A. B. Bodin, R. A. Krawokski and S. Ortolani, "The Reversed-Field Pinch: From Experiment to Reactor", Fusion Technology, vol. 10, pp. 307–353, 1986.

T. R. Jarboe, C. W. Barnes, D. A. Platts and B. L. Wright, "A Kinked Z-Pinch as the Helicity Source for Spheromak Generation and Sustainment", in Comments on Plasma Physics and Controlled Fusion, vol. 9, No. 4, pp. 161–168, Feb. 25, 1985.

J. C. Fernandez, B. L. Wright, G. J. Marklin, D. A. Platts and T. R. Jarboe, "The m−1 Helicity Source Spheromak Experiment", Physics of Fluids B. vol. 1, No. 6, Oct. 31, 1988.

J. M. Finn and T. M. Antonsen, "Comments on Plasma Physics and Controlled Fusion", vol. 9, No. 3, pp. 111–126, Dec. 27, 1984.

M. Ono, D. S. Darrow, G. J. Greene, H. K. Park and T. H. Stix, "Steady-State Tokomak Discharge via dc Helicity Injection", Physical Review Letters, vol. 59, No. 19, Nov. 19, 1987.

F. J. Wysocky et al, "Evidence for a Pressure-Driven Instability in the CTX Spheromak", Physical Review Letters, vol. 61, No. 21, Nov. 21, 1988.

TOPOLOGICALLY CONSTRAINED RELAXATION METHOD AND APPARATUS FOR PRODUCING REVERSED-FIELD PINCH WITH INNER DIVERTOR IN PLASMA CONFINEMENT

FIELD OF THE INVENTION

The present invention is generally concerned with plasma devices, more particularly with the confinement, stabilization and control of plasma in fusion devices by means of plasma relaxation effects and global topological magnetic constraint for the production of particular magnetic configurations with region of toroidal plasma and divertor, most particularly with open-ended vessel systems.

BACKGROUND OF THE INVENTION

Toroidal confinement plasma devices are devices in which a toroidal plasma is created in the space of a vessel which may be topologically that of a torus or of a cylinder, usually axisymmetric, and is confined therein by appropriate confining magnetic fields. Toroidal plasma devices are useful in the generation, confinement and heating, and study and analysis of plasmas. In particular, these devices are useful for reacting deuterium and tritium, deuterium and deuterium or other nuclear fusible mixtures, with the production of high energy neutrons and energetic charged particles as products of the nuclear fusion reactions.

At large, the problems in nuclear fusion devices are heating a dense enough plasma to a high enough temperature to enable the desired reactions to occur and confining the heated plasma for a time long enough to release energy in excess of that required to heat the plasma to reaction temperature and to maintain it thereat. The present invention is directed to the magnetic confinement of such plasma and finds particular utility in devices of this kind and their applications, including experimental devices and their use in experimentation and investigation related to plasma devices with toroidal discharges.

Several toroidal confinement plasma devices have been suggested and built. Most closely related to the present invention are: tokamak devices including divertor tokamaks, z-pinch devices including Reversed-Field-Pinch (RFP) devices; and spheromak devices, including those produced or sustained by z-pinch. In devices of this type, gas is confined in a toroidal region of the vessel and is heated to form a plasma which is generally held away from the walls of the vessel by appropriate magnetic fields. The topology of the vessel in such devices may be either toroidal (tokamak, RFP) or cylindrical (spheromaks), and these devices are generally axisymmetric. A topological torus/cylinder is any geometric solid figure that can be produced by an imaginary elastic deformation of an initial axisymmetric torus/cylinder. An axisymmetric torus has a hole, i.e. a region outside the toroidal volume, in the vicinity the rotational axis (major axis), whereas a cylinder is simply-connected, implying there is no such hole. An axisymmetric device is one in which all quantities are invariant to rotation about the rotational axis. A necessary condition for the magnetic confinement of plasma in a toroidal region is that there exist sets of nested toroidally closed magnetic surfaces in this region. A magnetic surface is defined as a mathematical surface, everywhere on which the magnetic field is tangential thereto. The magnetic surface enclosing zero volume in the center of a nest is called an elliptic magnetic axis. From the devices with a toroidal confinement region, those with toroidal vessel, called toroidal devices, ideally have only nested closed magnetic surfaces. Devices with open-ended vessel have, in addition, open magnetic surfaces which intersect the two end-surfaces of the topologically cylindrical vessel, in which case they have at least one separatrix, that is one magnetic surface separating the region of open magnetic surfaces from that of closed magnetic surfaces.

However, even for toroidal devices, it is sometimes found convenient to add a region with open magnetic surfaces, so as to produce a separatrix, having the role of an open-ended divertor. A divertor is a separatrix which establishes a transition between the set of magnetic nested toroidal surfaces and magnetic surfaces directed to the boundary. A divertor may have a profound influence on a plasma confinement device. Not only does it have as a primary effect, the isolation of the toroidal confinement plasma region from the surrounding region of the vessel by contributing to redirecting to the boundary impurities scraped off the wall, but it may also lead to an improved confinement state. This is illustrated by the so-called H-mode found in tokamaks, which is a regime of enhanced confinement, and requires almost always a divertor to be established. The presence of a divertor is also beneficial for ash-removal.

In some toroidal plasma confinement devices, the confining magnetic field includes magnetic field components produced by currents flowing through the confined plasma itself. However, in some of these devices, such as the tokamak, the toroidal field, much larger than the poloidal field, remains essentially produced by external means. External toroidal coils then determine the plasma equilibrium and avoid instabilities. On the other hand, in other devices, the toroidal field—of comparable amplitude to that of the poloidal field—is in great part, as in RFP, or entirely, as in spheromak, produced by the plasma current itself. The equilibrium is then reached at the outcome of a self-consistent process called plasma relaxation. These may be called therefore relaxation devices.

During relaxation, a plasma initially produced in an unstable state releases part of its free energy through a turbulent process till it reaches a lowest energy equilibrium state. Relaxation is a complex process of self-organization of a resistive plasma, which may involve substantial modification in its magnetic field, in particular in the topology of the magnetic surfaces. In its general behaviour, the relaxation process in relaxation devices seems to be quite well accounted for by J. B. Taylor's conjecture, Phys. Rev. Lett. 33 (1974), pp. 1139-1141. This conjecture states that very few magnetohydrodynamic (MHD) invariants from amongst the infinity of ideal MHD invariants holding for null resistivity, still hold on the time-scale of resistive relaxation. For the considered toroidal devices, the essential long-life invariant is global helicity, defined as:

$$H = \int A \cdot B \, dV \tag{1}$$

the integral being performed over the total volume of the toroidal vessel. A is any potential vector of B, satisfying $\overline{\nabla} \times A = B$. For open-ended devices, the definition for helicity must be substituted by a less simple one, taking into account boundary effects. Remaining invariant on a large time-scale, helicity provides therefore a central constraint, determining the final equilibrium state. If this is the unique MHD invariant on large timescals, then the relaxing plasma decays to the lowest energy state compatible with the geometry of the vessel and the value of H. This state may be shown to satisfy the equilibrium equation:

$$\mu_o J = \overline{V} \times B = \mu B \qquad (2)$$

where J is the current density, $\mu_o$ is the magnetic permeability at vacuum, and $\mu$ is a constant, independent of space, and has dimension of inverse length.

The physicality of the assumption that constant helicity plays a central role in modeling of relaxation has been largely confirmed by subsequent observations on prototypes built in different laboratories: RFP, multipinch, spheromaks.

In most relaxation devices, the only main additional magnetic constraint is the conservation of toroidal magnetic flux, for toroidal devices, or poloidal flux when externally imposed in open-ended devices. In such case, the stable equilibrium of the relaxed state is the solution of equation (2) with lowest $\mu$ among the possibly multiple solutions compatible with the values of the helicity, of the conserved flux and of the geometry of the vessel. Only that lowest energy solution, called the Taylor state, may be stable. Since no more free energy is available unless H is changed, the Taylor state is stable to ideal MHD instabilities, as well as to some resistive instabilities. However, the lowest energy solution is not necessarily the most favorable one for fusion application, in particular, as will be discussed below, when plasma pressure is taken into account. Yet the other equilibrium solutions of equation (2) are bound to decay unstably to the Taylor state, because, in present art relaxation devices, there is no additional constraint in the relaxation process to prevent this decay.

In certain MHD systems, however, there may be present an additional robust invariant of topological origin. This is a homotopic invariant, implying that it is insensitive to local change of topology of the magnetic surfaces, and that it may therefore be of comparable life-time to that of global helicity having a central role in modeling relaxation. Homotopy theory is the branch of topology which deals with the continuous deformations of fields. It should be distinguished from homeomorphy, which deals with the deformation of one surface into another. Homotopy, by contrast, determines whether one field configuration can be continuously deformed into another. The set of all configurations continuously deformable one into the other is called a homotopy class. Two configurations belonging to two different homotopic classes are not continuously deformable one into the other, and therefore one will not dynamically evolve into the other, which introduces an additional constraint. Conditions can be created in MHD systems where there is more than one homotopy class for the magnetic field, each class corresponding to a different value of a homotopic invariant. Existence of such systems was proved by Finkelstein, D. and Weil, D., International Journal of Theoretical Physics, Vol. 17, No. 3 (1978), pp. 201–217. In present art plasma relaxation devices, no device takes advantage of a magnetic homotopic invariant as a topological constraint in the relaxation. Yet, as already mentioned, from all the solutions of equation (2) for a given geometry, the lowest energy one is not necessarily the most favorable one in fusion reactor context, in particular with respect to the maximal plasma pressure tolerated by the magnetic configuration.

Equilibrium states obeying Equation (2) have no pressure gradient, because $\overline{V}p = J \times B$. For practical purposes, real plasma must differ from Taylor state at least slightly, since real plasma must have finite pressure, and, actually, substantially high pressures are desired for fusion application. Such pressure is measured in terms of the quantity:

$$\beta = \frac{<P>}{<B^2>/2\mu_0}$$

$\beta$ being the ratio of the mean plasma pressure to the mean magnetic pressure (here and throughout the remainder of this disclosure the system of units used is SI mks). For finite $\beta$, instabilities due to plasma pressure may arise, in particular the MHD interchange instabilities.

The MHD stability of a magnetically confined plasma with finite pressure is dependent on the pitch of the magnetic field lines encircling the magnetic axis. In toroidal plasma devices it is customary to use instead the safety factor q where:

$$q = \frac{1}{2\pi} \int \frac{dlB_\phi}{RB_p}$$

this integration being performed, for axisymmetry, along close field lines of poloidal magnetic field $B_p$. R is the distance from major axis and $B_p$ is the toroidal magnetic component.

In order to be MHD stable, toroidal plasma devices with finite pressure gradient must satisfy certain necessary conditions on q. In particular, if r is the mean minor radius of the toroidal surface, then:

$$S = \frac{r}{q} \frac{dq}{dr}$$

must be large enough to satisfy relevant criteria including the Mercier criterion. s is the magnetic shear, which exerts a stabilizing effect on many classes of instabilities, particularly on MHD interchange instabilities.

It has been computed (C. M. Bishop, Nuclear Fusion 26 (1986), pp. 1063–1071) that stability to these interchanges is enhanced with the presence of a divertor, and that the stability properties become better as the poloidal null-point of the divertor is moved progressively towards the inside of the torus. Thus an inner divertor on the very inside may be the best operation for a toroidal confinement plasma device.

The most commonly used toroidal magnetic confinement configuration at present is the tokamak, whose principle defining characteristic is to achieve MHD stability requirements by supplying a sufficiently large toroidal magnetic field intensity $B_t$, so as to be much higher (typically 5 to 10 times higher) than the poloidal magnetic field. The toroidal field must be provided by a large toroidal field coil system disposed around the confinement vessel. The theoretically predicted maximum $\beta$ is limited to be of the order of 0.10. Because of the small $\beta$ of the tokamak, fusion reactors based on this concept must either be large or must employ extraordinary high toroidal field strength.

Reversed-Field-Pinches (RFP) devices are most readily distinguished from tokamaks, which they superficially resemble, by being relaxation devices where the toroidal field is of approximate same amplitude as that of its poloidal field. As a consequence, a RFP device can achieve the same plasma density at much lower toroidal field than the tokamak. A recent review of the RFP art has been given by Bodin, H. A. B., Krakowski R. A., and Ortolani S., Fusion Technology 10 (1986), pp 307–353. The theory of relaxation under constant helicity accounts remarkably well for the universality of the RFP equilibrium states reached after relaxation. In particular, it is observed, as predicted by the theory, that for sufficiently high current densities, so that the product of $\mu$ by the the minor radius of the torus exceeds the critical value of 2.4, spontaneous reversal of the toroidal field at the edge of the plasma takes place. That is, the magnetic field component sensibly parallel to the magnetic axis has a direction in the outside region of the plasma opposite to its direction in the inner region, and as a result, g(r) passes through zero and changes sign near the boundary of the plasma. In general, the magnitude of q in the RFP remains everywhere substantially smaller than 1, but the shear is relatively high and, as a consequence, the maximal $\beta$ achievable in RFP devices is greater than in a tokamak. $\beta_p$ may be as high as 0.4. Fusion reactors based on the RFP concept can, therefore, either be smaller or use lower magnetic fields than with tokamaks.

However, the RFP device, as the tokamak, requires for its functioning toroidal field coils which link the plasma. The presence of this hard core at the center of the device introduces a most severe technological constraint in the practical design of such toroidal devices and it particularly complicates actual reactor design by requiring a toroidal blanket. In addition, the implementation of an inner poloidal divertor, considered as most suitable for enhanced stability and confinement, is rendered problematic by the presence of the hard core. In such toroidal devices, a divertor is introduced as an extraneous structure by additional coils. So far, several tokamaks have been built with poloidal divertors but none of them with an inner divertor. For RFP devices, most considered divertors divert the toroidal field, preserving the poloidal circular symmetry around the elliptic magnetic axis, and no RFP with inner poloidal divertor has been developed. The small-major radius side of these toroidal devices with inner hard core, for the RFP as well as for the tokamak, is already crowded and under high stress. An inner divertor would further complicate the design.

Other relaxation devices with toroidal region of confinement have been developed which do not involve an inner hard core. These bear the generic name of spheromaks. In a spheromak, the toroidal field is produced entirely by the plasma current. This has for an advantage obviating the requirement for the toroidal field coils. Unfortunately, the spheromak does not have high shear and it has been theoretically predicted to have small maximal $\beta$. There are data suggesting that interchange instability is observable in contemporary spheromak experiments (see, in particular, Wysocki, F. J., et al., Physical Review Letters, Vol. 21, p. 2457 (1988). In the spheromak, there is no reversal of the toroidal field. The spheromak has a low shear because q varies between 0.8 and 0.7 in the classical spheromak, or between 0.8 and 0 in the spheromak with a hole. Some spheromaks have plasma on open field lines, yielding some kind of divertor, but no spheromak has a unique poloidal divertor situated in the innermost part of the toroidal region. The lack of reversal and the low shear, as well as the absence of an inner divertor, are linked to the fact that the lower energy Taylor states do not satisfy these properties and that there is no additional constraint to withhold decay to these Taylor states.

SUMMARY OF THE INVENTION

The present invention involves a fundamentally different confinement principle, combining best advantages of spheromaks and of RFP devices in a relaxation device. The basic invention can be viewed as a RFP relaxation device in which the solid linner axial core has been replaced by a straight high-current plasma relaxation channel so as to produce a RFP with an inner divertor. A non-zero homotopic invariant is introduced, which provides an additional constraint in relaxation, provided the component of the poloidal magnetic field at the boundary of the vessel is maintained at a definite sign, which can be achieved by small currents in toroidal coils exterior to the conducting shell. The relaxation of the straight and toroidal plasma regions under the topological constraint produces an open-ended separatrix with reversed toroidal component and with one poloidal divertor, detached from the wall, and situated in the inner small major-radius side of the torus. The precise shape of the plasma can be adjusted and sustained by control of the axial current and of the poloidal magnetic field coils.

Stability in the topomac (device in accordance with the present invention) is obtained by a q profile and conducting shell as in the RFP, plus the additional topological constraint. The poloidal divertor introduces high magnetic shear, and is mostly effective as the toroidal component at the divertor increases. Its innermost location is optimal to reach enhanced stability to ballooning modes which threaten to limit RFP $\beta$. The topological constraint prevents the configuration to decay to a lower energy equilibrium state without inner reversed poloidal divertor, and hence with lower $\beta$. In general terms, introduction of the non-zero homotopic invariant, according to the present invention, increases the maximum $\beta_p$ that can be accomodated. Like the spheromaks, the toroidal field of the topomak is essentially produced by the self-currents; moreover, the boundary poloidal fields to be produced by the external toroidal coils are small (typically one half) compared to the maximum field-amplitude created at the core of the plasma. This considerably alleviates the technical requirements concerned with having high fields in the center of the Reversed-Field-Pinch region of the plasma.

The device of the present invention is distinctly different from prior art RFP, by the absence of a hard core conductor linking the plasma for providing a toroidal field, which frees it from severe engineering constraints inherent to toroidal RFP and tokamak geometries. In particular, it is distinctly different from RFP's and tokamaks involving poloidal divertor: it is distinctly different from prior art helical pinches as in T. Ohkawa's U.S. Pat. No. 4,302,284, sometimes referred to as OHTE, whose poloidal nulls are at the plasma surface rather than internal; it differs from prior art multiple pinch method, as in T. Ohkawa's U.S. Pat. No. 4,543,231, whose current channels, being surrounded by a set of nested closed magnetic surfaces are all toroidal, so that the separatrix null does not provide an open-ended divertor and the shell is toroidally closed; it is also distinctly different from the prior art doublet device, as in T. Ohkawa's U.S. Pat. No. 3,692,626, which involves tokamak current channels with large toroidal field, hence lacking reversal, and with toroidal vessel.

The device of the present invention is also distinctly different from the prior art spheromaks which, while having toroidal and poloidal fields of comparable intensity, do not involve a toroidal field reversal, thus keeping $\beta$ low. In particular, it is distinctly different from open-ended spheromaks such as the bumpy z-pinch (Jensen T. H. and Chu, M. S., J. Plasma Physics, Vol. 25, part 3, pp. 459-464, 24 May 1980), and related spheromaks with open field-lines, which, in some of the forms discussed in literature, superficially resemble. These devices essentially adjoin a spheromak to the open field lines regions in the vessel with cylindrical topology, and as a result, there is no reversal. By contrast, the present invention, in its simplest form, adjoins to the open field lines one RFP region, hence with toroidal field reversal, allowing for high magnetic shear. This differentiation is linked to the more fundamental difference, that in the present invention there is a non-zero homotopic invariant, providing an additional constraint on the relaxation, whereas in the open-ended spheromak, there is no such invariant. Moreover, the topomak also differs from the open-ended spheromak in the respective shape of the separatrix. A spheromak has two poloidal nulls, symmetrically distant away from the midplane, whereas in the present invention, there is one unique poloidal null situated in the midplane, and in the small major-radius side of the torus. As a result, the separatrix of the topomak has the advantage that it can fulfill most efficiently the role of a divertor, that its divertor null is at optimal location for stability, and that the conducting shell can be close-fitted to most part of the boundary of the RFP region. The topomak is further differentiated from the open-ended spheromak device by their different q profiles. The open-ended spheromak profile is everywhere greater than zero, from $+\infty$ at separatrix down to some positive value (less than one) at elliptic axis; whereas in the topomak, q is monotonically varying from $+\infty$ at the separatrix down to negative values as low as $-0.5$ at elliptic axis (with absolute value of q less than one in most part of the toroidal region), yielding a substantially higher magnetic shear.

Thus it is a primary object of the present invention to provide a toroidal Reversed-Field-Pinch (RFP) plasma within an open-ended vessel, with separatrix involving one poloidal null in the innermost part of the torus, generated by the relaxation of straight and toroidal plasma regions, using a non-zero homotopic invariant as additional constraint in relaxation. Other objects and advantages of the present invention will become evident from the consideration of the following detailed description, particularly when considered in conjunction with the accompanying drawings.

DETAILED DESCRIPTION OF THE INVENTION

Figure 1:
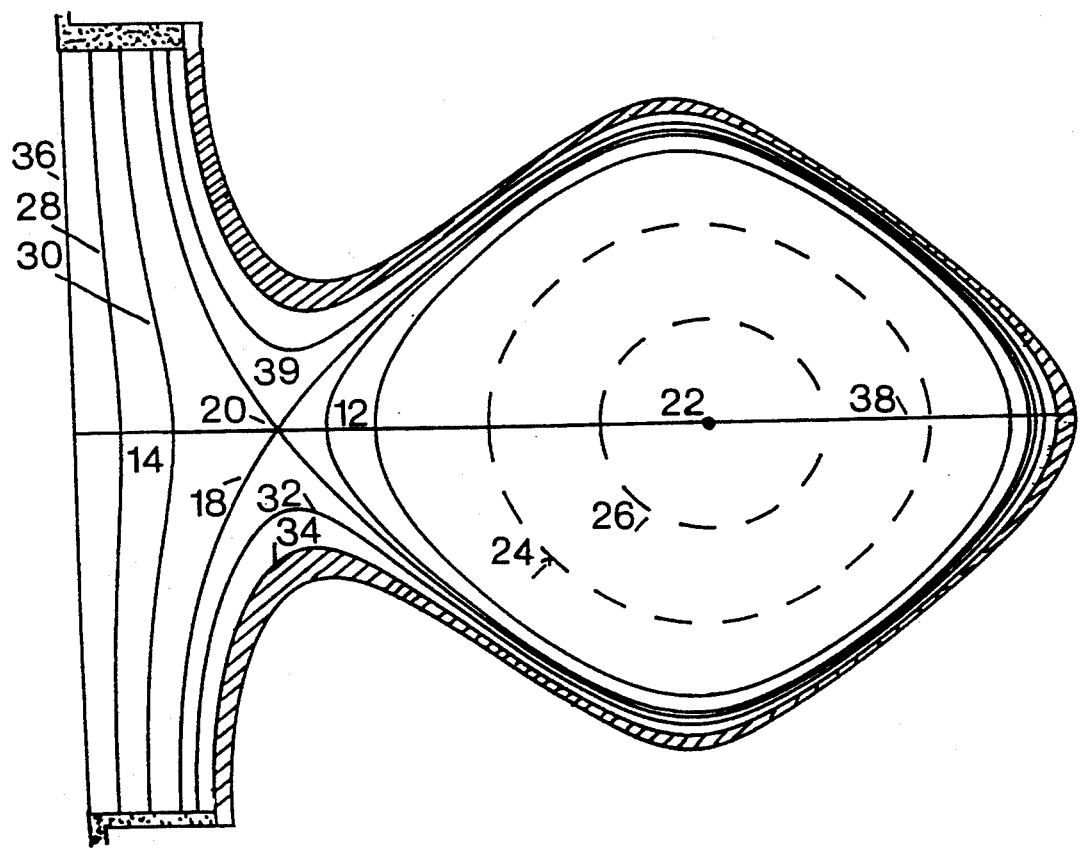
FIG. 1 illustrates the magnetic surfaces obtained, including the inner reversed poloidal divertor, when one straight and one toroidal relaxing plasma region are combined in accordance with a preferred form of the present invention.
Figure 2:
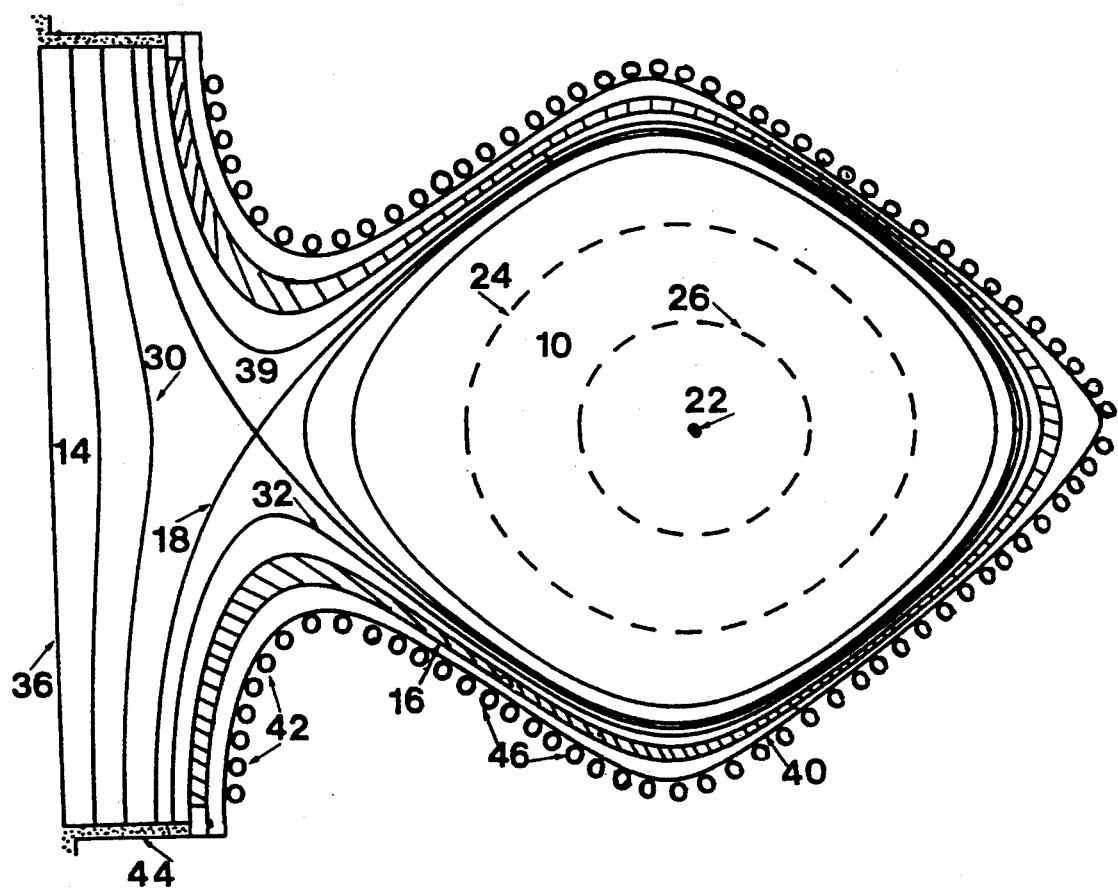
FIG. 2 is a poloidal sectional view of a schematic preferred embodiment of the present invention for producing the magnetic surfaces shown in FIG. 1.
Figure 3A:
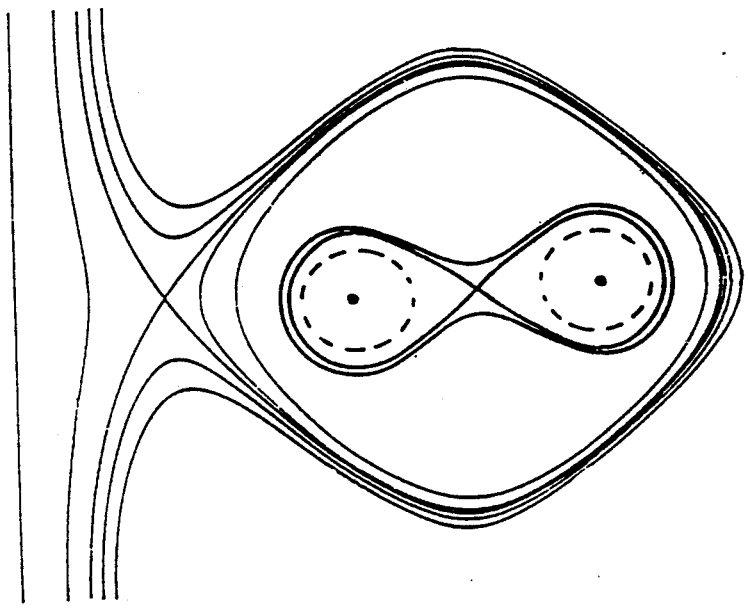
FIGS. 3A and 3B illustrate the simplest arrangement of straight and toroidal relaxing plasma regions for configurations with homotopic invariant $K=2$.
Figure 3B:
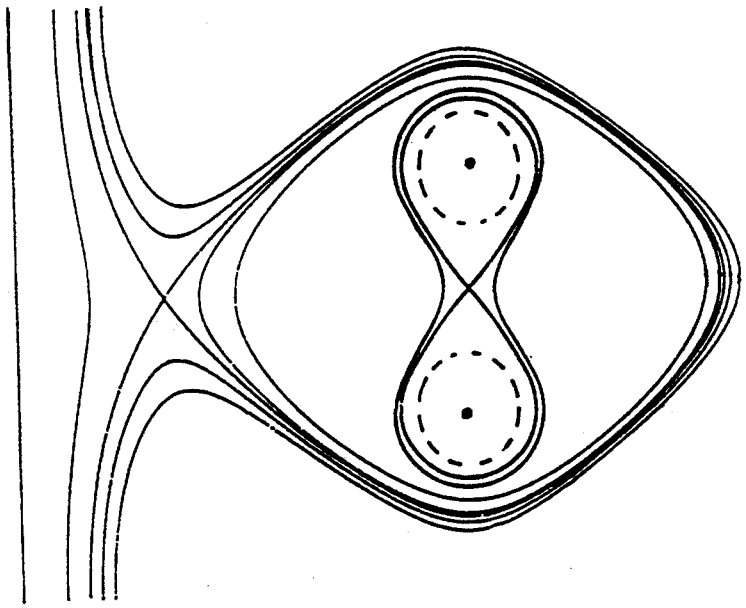

Central to the concept of the invention is the generation and control of one straight and at least one toroidal relaxing plasma region within a simply-connected common volume so as to produce a RFP configuration with an inner open-ended poloidal divertor, utilizing a non-zero homotopic invariant. The preferred embodiment described herein uses, where possible, techniques and apparatus that are known in the art of producing and applying hot, magnetically confined plasmas. A preferred embodiment of the invention is illustrated in FIG. 2, such device producing magnetic surfaces as illustrated in FIG. 1. As illustrated in FIGS. 1 and 2, a plasma comprising one toroidal relaxing plasma channel (10) with region of toroidal reversal (12) and one straight relaxing plasma channel (14) is created within a primary vacuum chamber formed by a wall (16) so as to form an open-ended divertor separatrix (18) having poloidal null (20) in the inner side of the toroidal region, with elliptic axis (22) and nested closed magnetic surfaces (24) and (26), and with nested open magnetic surfaces (28) and (30), respectively. In the Figures, flux surfaces where the toroidal magnetic component is negative are dotted. Surrounding magnetic surfaces (32) and (34) at the outerboard of the toroidal pinch are also illustrated in FIGS. 1 and 2. Relaxing plasmas regions (10) and (14) and chamber wall (16) are symmetric with respect to the toroidal major axis (vertical axis of rotational symmetry) (36) and midplane (38). The chamber wall (16) is made of a material having low electrical conductivity and compatible with high vacuum technique as practiced in RFP devices. It should have sufficiently high toroidal resistance so as to permit penetration of induced toroidal electric field in time desired to drive toroidal plasma current. Standard vacuum pumping systems are used for evacuating the chamber to high vacuum. The chamber wall (16) is shaped so as to closely approximate the desired shape of the plasma.

The major radius $R_0$ of the plasma device illustrated is 0.24 m from the major axis (36) to the elliptic axis (22). The chamber is 0.27 m high with 0.35 m radius at its widest midplane point and 0.05 m radius at its extremities. The minimal vertical diameter of the "neck" (39), establishing transition between the open-ended region ("shaft") (10) around the axis (36) and the toroidal region (14), is 0.11 m in the illustrated embodiment, but the exact value of this dimension may be changed as desired or required for improved plasma performance with no change in the nature of the invention. Large necks allow for a more effective helicity pumping from the cylindrical region (14) surrounding the major axis (36) into the toroidal region (10), whereas small necks allow for a more effective close-fitting shell for stabilization.

Chamber cross-sectional dimensions may be scaled to be larger or smaller, maintaining proportions close to those given above.

The characteristic boundary shape, the purpose of which is to force the relaxation of the straight plasma discharge (14) and toroidal plasma region (10) and the formation of the inner divertor (18), is imparted by a shaped shell (40) and distributed poloidal field windings (42) and (46).

Shaped conducting shells have been used for many years to impart particular shapes to plasmas, with the most similar prior art applications being in multipinch toroidal devices, as in Ohkawa's U.S. Pat. No. 4,543,231. The exact shape of the shell (40) is determined by solution of the Grad-Shafranov equation for MHD equilibrium to be described in subsequent paragraphs, in order to yield a plasma with the properties sought. At the same time, the close-fitting shell (40) allows, together with the divertor (18), for benefiting from stabilization by image-currents to surface-modes without detrimental interactions of the plasma with the wall (16). The shaped shell is made of a highly conducting metal. The shell also includes an electrically non-conductive break to prevent the flow of net toroidal current in the shell, which would otherwise act as a short-circuited secondary circuit for induction winding.

The purpose of the electrodes (44) is to create an axial electric field to ionize gas within chamber (16), thereby generating plasma, and to drive sufficient current through said plasma to contribute an important part in its resistive heating to high temperature. The axial current also contributes an important part of the toroidal magnetic field in the toroidal region of confinement of the hot plasma, as well as of its poloidal magnetic field, through helicity injection. The basic principles of this technique are nowadays well understood and have been applied in several devices, such as in the sustainment of a spheromak, using a kinked z-pinch as the helicity source (Jarboe T. R., Barnes C. W., Platts D. A. and Wright B. L., in Comments Plasma Phys. Controlled Fusion, 1985, Vol. 9, No. 4, pp. 161-168). Thus, the current driven between the electrodes must be sustained for the desired duration of plasma confinement. For the embodiment illustrated in FIGS. 1 and 2, at steady state, a d.c. voltage of 20 V is to be maintained between the electrodes, in order to sustain the desired toroidal magnetic field, driving a vertical current of 15 kA. Since large currents are required to be driven between the electrodes, they must be made of a material particularly resistant to high heat loads. Special shaping of the electrode may reduce the heat load per surface unit; moreover, in order to allow for a rapid reversal of the axial magnetic flux, according to the preferred method of production described hereunder, the electrodes should be hollow (not illustrated). The electrodes (44) are separated from the wall (16) and from the shell (40) by electrical gaps.

The primary purpose of the poloidal field coils ((42) and (46)) is to provide magnetic boundary conditions required for the preservation of the topological variant. Poloidal field coils (46) serve also as vertical field coils in the discharge channel (14) between the electrodes (44) according to a technique standard in "stabilized z-pinch" devices.

Both coils ((42) and (46)) may also conveniently serve as induction coils, and supplement the electrodes (44) in heating the plasma. Namely, they may induce sufficient high toroidal current through said plasma to contribute significantly to its resistive heating. In the illustrated embodiment, the plasma toroidal current in the toroidal region at steady state would be around 60 kA. The electrically non-conductive break in the shell (16) prohibits the flow of net toroidal current in the shell, which would otherwise act as a short-circuited secondary circuit for the induction winding. This aspect of the device and the basic design considerations thereof, especially for coils (42), such as energization through capacitor bank, are similar in the present invention to those in RFP and other ohmically heated toroidal plasma devices.

Finally, the induction coils (42) and (46) may also conveniently serve for an additional purpose, namely, to supplement the shell (40) in shaping the plasma. Because magnetic flux diffuses through a shell with finite resistivity, the power of the shell to control the shape of the plasma is lost after the so-called $T_{shell}$ time. The currents in external conductors such as coils (42) and (46) may be distributed so as to provide magnetic boundary conditions identical to those of the shell. The field amplitudes to be produced are of order of 0.1 T in the mean for the illustrated embodiment. Shaping by external coils has been demonstrated in Doublet tokamaks experiments and, using this technique, the duration of the plasma is not limited by the $T_{shell}$ diffusion time. In FIG. 2, the individual turns of coils (42) and (46) are shown with a distribution that achieves the fundamental purpose. An infinitude of such distributions may be found, and satisfactory designs may also be obtained with different number of turns than illustrated.

The general behaviour of relaxing plasmas within an open-ended vessel, containing at least a small magnetic field with open-ended field lines, can be deduced from Taylor's original theory of relaxation of plasmas in toroidal vessels. Although the helicity, as expressed in Equation (1), becomes ill-defined when the vessel boundary is not a magnetic flux-surface, an alternative quantity can be introduced with analogous properties (such "alternative helicity" has been discussed, e.g., by Finn, J. M. and Antonsen, T. M., Comments Plasma Phys. Controlled Fusion, 1985, Vol. 9, No. 3, pp. 111-126). In particular, its approximate conservation can be assumed during resistive relaxation, and minimization of the energy under this sole constraint and the appropriate boundary conditions yields again Equation (2) for the relaxed state.

This extension of Taylor's relaxation theory describes the principal features of open-ended toroidal plasmas as observed in experiments. In particular, plasmas tend to approach the configuration described by Equation (2), independently of their initial state and the particular method used to produce them. There may be more than one solution to Eq. (2) in the given shell geometry with the given boundary conditions, in which case, Taylor's theory predicts that only the equilibrium with lowest energy is stable. However, higher energy solutions of Equation (2) may be found as more suitable equilibria for plasma confinement, in particular because they involve generally a higher magnetic shear.

A principal object of the present invention, stated in the context of the preceding discussion, is to introduce an additional constraint in relaxation, to prevent decay to an unfavorable lower energy solution, by means of a homotopic invariant. For MHD systems admitting a homotopic invariant, this lowest energy solution is not available, if it belongs to a different homotopy class than the relaxing configuration.

The magnetic field of an MHD system in an axisymmetric simply-connected vessel has more than one homotopy class provided two conditions are satisfied:

1. There is no three-dimensional null point in the plasma. This may be controlled by the external coils and mainly by the current driven by the electrodes which assure, in particular, that at poloidal null, the toroidal component is substantially far from zero. More generally, the higher the temperature of the resistive plasma, the larger the time-scale during which the development of such null-point is inhibited.
2. In some vicinity of the major axis, the field has a normal component, and, on the remaining part of the vessel surface, the direction of the field is tangential and is nowhere antiparallel to its direction on the major axis. This latter condition can be simply obtained by external toroidal coils controlling the boundary poloidal field.

If said two conditions are maintained, then one has a homotopic invariant, related to the relative homotopy of $\pi_3(S2)$, itself related to the so-called Hopf invariant (see Finkelstein, D. and Weil, D., the International journal of Theoretical Physics, Vol. 17, No. 3 (1978), pp. 201–217), which has an integer value K. The class with K=0 includes the configurations which have no toroidal field-reversal, to which the lowest energy Taylor's states belong. Thus, it is the object of the present invention to have a plasma equilibrium configuration with K different from zero. Present inventors have named such a configuration a Dag. In the case of axisymmetry, the presence of at least two magnetic axes with toroidal field of opposite sign, is a necessary crucial condition. Otherwise, one of the toroidal directions is certainly excluded from the total range of directions of the field configuration, and configurations where all possible azimuthal directions are not reached by the field always have K=0. For the simply-connected geometry of the plasma vessel considered in the present invention, with the above boundary conditions, a Dag configuration should possess at least one pair of elliptic and hyperbolic axes, the toroidal component of which are reversed one with respect to the other. The simplest example is the Topomak configuration, examples of which are given in the followings.

The general nonsingular axisymmetrical solution in cylindrical coordinates of Equation (2) for Taylor equilibrium states is given by the Chandrasekhar-Kendall form:

$$B_r = \Sigma \frac{ka_k}{(\mu^2 - k^2)^{\frac{1}{2}}} J_1[r(\mu^2 - k^2)^{\frac{1}{2}}]\sin kz$$

$$B_\phi = \Sigma \frac{a_k\mu}{(\mu^2 - k^2)^{\frac{1}{2}}} J_1[r(\mu^2 - k^2)^{\frac{1}{2}}]\cos kz$$

$$B_z = \Sigma a_k J_0[r(\mu^2 - k^2)^{\frac{1}{2}}]\cos kz$$

The solution consists of the sum of linearly independent modes, specified by mode number k, with amplitude $a_k$: $J_0$ and $J_1$ are the Bessel functions of the first kind, respectively of order 0 and order 1.

A topomak equilibrium has one pair of elliptic and hyperbolic axes with reversed toroidal orientation of one with respect to the other. This implies having the direction of B at midplane of symmetry performing at least one full rotation, as distance from major axis r increases. The k=0 mode alone realizes that, provided $\mu \cdot r$ can be as high as 7 within the vessel. However, this mode does not have closed magnetic surfaces. Thus, we consider as next simplest trial solution a superposition of the k=0 mode with one additional k mode. To prevent the occurrence of null points on the major axis (one of the conditions for the topological constraint), we impose $|a_k/a_o|<1$. Poloidal nulls are then located on midplane at the roots of the equation $B_z(r)=0$. Thus, the first two consecutive roots should have opposite signature (signaling whether it is an 0 point or an X point) and opposite $B_\phi$. One can show that this happens if k is sufficiently close to $\mu$ for a definite range of negative values of $a_k/a_o$. In addition, to obtain a Topomak, the separatrix originating at the X point should enclose the 0 point. For the convenient choice of $\mu=25$, this is satisfied for k=22 provided $-9.6<a_k/a_o<-4.5$, and for k=23 provided $-8.6<a_k/a_o<-3.8$.

Thus, diverted RFP Taylor states with non-zero homotopic invariant exist. Basically, the axial hard core of a conventional RFP system is replaced by a relaxed equilibrium of an axial straight plasma current channel, and the resultant is a Reversed-Field-Pinch with an inner reversed divertor Taylor state.

Figure 4A:
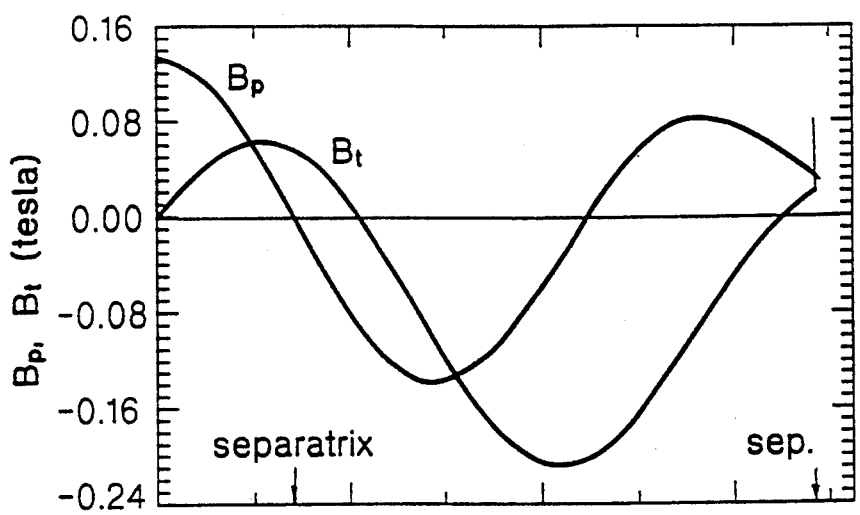
FIGS. 4A, 4B and 4C show, respectively, toroidal and poloidal components of the magnetic field at midplane, q profile, and maximal Mercier pressure profile, as computed from a specific topomak equilibrium solution corresponding to FIG. 1.
Figure 4B:
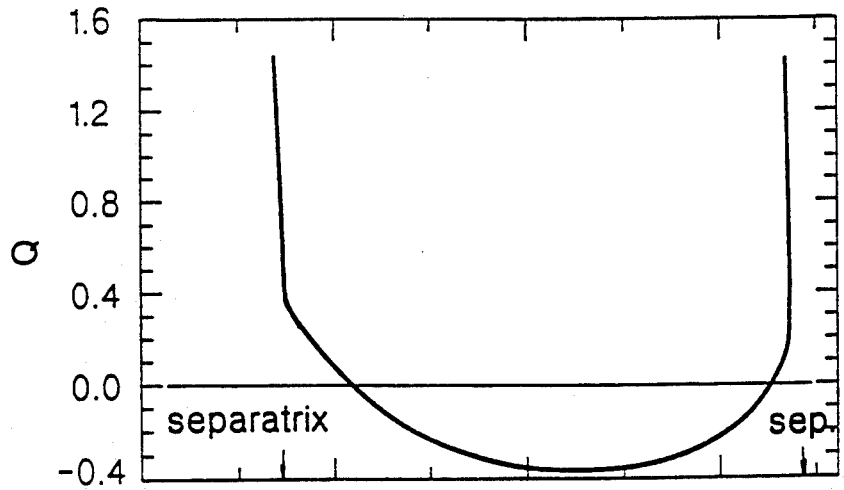

Solutions with a higher topological number can be constructed in a similar manner. For example, a Dag with topological number K=2, consists of two toroidal current channels, forming together a doublet with a figure-eight-like separatrix, together with a vertical straight relaxation current channel with an inner divertor. The toroidal magnetic field at the two elliptic axes is in opposite direction to the direction of the toroidal field at both hyperbolic axes on the close and open-ended separatrices. It is clear that still higher K states can be readily constructed. It is also obvious that if one does not require the Dag to be in a Taylor state, the x point with reversed toroidal direction relative to the direction at the 0 point may be situated at other location than at most inboard location on the torus surface. FIGS. 4A and 4B illustrate plasmas with K=2, in their most symmetric orientations in axisymmetric geometry. Intermediate orientations could be possible, but they add complexity with no apparent increased benefit.

The most straight-forward method to produce plasmas approximating a desired Taylor state is to:
1. Construct a conducting metal shaping shell whose shape is identical with the outermost magnetic surface of the desired state.
2. Prior to formation of the plasma, establish a vertical magnetic field in the shaft region of the enclosed evacuated cylindrical volume, using coils (42).
3. Inject the gas that will be ionized into plasma, using any conventional means. Optionally, the gas may be preionized.
4. Establish a vertical electric field along the axis of the shaft region of the vessel by external electrodes so as to ionize the gas completely and drive a vertical current creating open poloidal field lines in this region.
5. Let the straight-plasma column relax into the toroidal region. In virtue of Taylor principle, the plasma state reached will have for appropriate parameters a toroidal region with closed poloidal field lines and with toroidal component. Analogous technique of relaxation has been probed in several recent experiments on spheromak, RFP, and tokamak. If necessary, one may assist the desired relaxation process by using the shaping coils (46) at the boundary of the toroidal part of the vessel as inductive coils to create closed nested magnetic surfaces with relaxation to the desired Taylor state. This state however will not be a Dag, as there is no field reversal, and the separatrix, in general, involves two x-points on the wall.

6. Reverse the direction of the axial current discharge between the electrodes, and the direction of the external vertical magnetic field (together with toroidal current component created by inductive coils around the axial region). Optional shaping coils (46) of the toroidal region may be maintained during this stage with same current orientation as in previous stage. This assures the proper boundary condition for the poloidal field and has for result to modify the separatrix to the desired one: one inner divertor with toroidal field reversed with respect to the direction of the toroidal component of the core of the toroidal region obtained in previous stage.
7. Once the proper topology has been produced (toroidal component at the inner divertor reversed with respect to that at the elliptic axis), adjust electrode current and boundary poloidal field (by shaping coil) to level of the desired plasma state, so as to reach the optimally stable relaxed state of the resistive plasma. Gas may be let into the chamber slowly to replenish gas absorbed by the metal walls.
8. The shape of the flux surface does not change radically as the mode amplitude ratio is changed within some controlled range. Therefore, a single shaping shell (16) can be used to study a continuum of neighboring equilibria by magnetically adjusting the boundary conditions by means of small currents through additional toroidal coils of various location exterior to said shell, as, for instance, in T. Okhawa U.S. Pat. No. 4,543,231 for shaping of multipinch plasma.
9. The possibility of helicity injection by the electrodes along the vertical field produced by external coils allows for maintenance in a steady-state regime. Sustainment of Taylor state in steady state using helicity injection by means of electrodes has been realised in several spheromak and tokamak devices (such as in M. Ono et al., "Steady-State Tokomak Discharge via dc Helicity Injection", Physical Review Letters, Vol. 59, No. 19, Nov. 9, 1987).

Figure 4C:
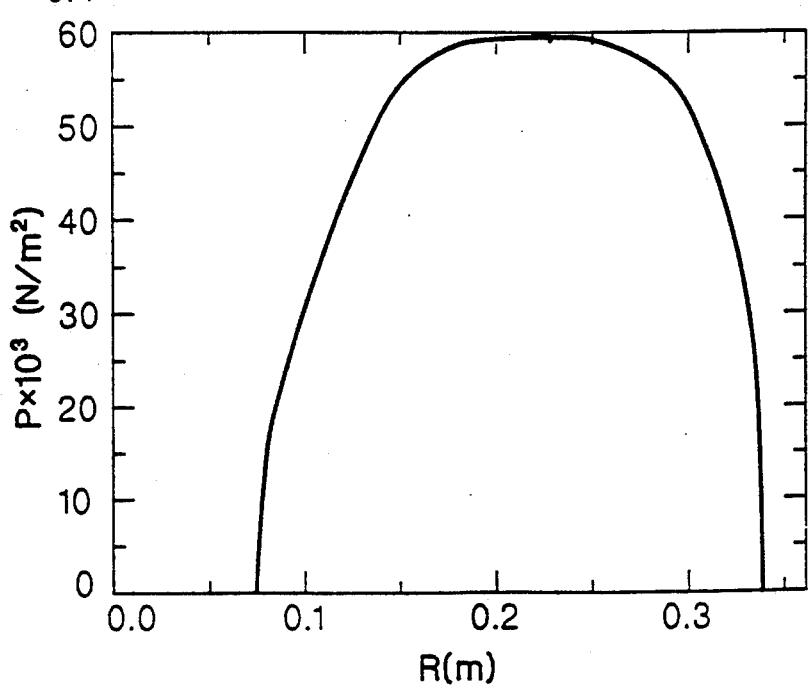

Axisynmetric plasma equilibria with finite plasma pressure and a general specified toroidal current density may be calculated by solving the finite pressure Grad-Shafranov equation. For instance, a family of solutions with pressure field function $p(\psi)$, specified arbitrarily, is obtained by adding $$\frac{1}{8} \frac{dp}{d\psi} r^{\pm}$$

to the zero pressure toroidal flux solution $\psi$. However, not all these solutions are stable. Mercier criterion allows for an estimate for the maximal pressure acceptable without driving an interchange instability, assuming that the back effects of the pressure on the magnetic field configuration can be reasonably neglected. The magnetic flux-surfaces of FIG. 1 are drawn from a numerical solution of the Grad-Shafranov equation with zero pressure. For FIG. 1 the aspect ratio $A = R_0/a$ is 1.7, where $R_0$ is the major radius of the elliptic axis and a is the half width of the toroidal plasma width at its widest point. The toroidal field on the separatrix is reversed and substantial, due to finite current along the vertical axis. Plots of $B_p$, $B_\phi$, q and maximal p derived from this numerical solution are given in FIGS. 4A, 4B and 4C as a function of r at midplane $z=0$.

Thus, the desired inner reversed divertor is still obtained with a realistic plasma current distribution by means of the present invention, consisting of a combination of straight and toroidal relaxing current channels generating a non-zero magnetic homotopic invariant.

The occurrence of the non-zero homotopic invariant in the combination of straight and toroidal relaxing plasma regions can be explained in simplified qualitative terms. The toroidal magnetic field at the hyperbolic axis is reversed with respect to that of the elliptic axis. Moreover, the poloidal field at the boundary vessel is approximately parallel to that on the central axis. Therefore, the magnetic field, as it progresses from the central axis outwards to the boundary, at midplane, has performed a complete rotation of 360° (or somewhat more). This corresponds to a closed circle on the sphere representing all possible directions. As the total surface of the poloidal cross-section is swept by an imaginary deformation of the $z=0$ chord, the sphere of directions is covered once. This yields $K=1$, which remains invariant under any deformation. If the toroidal field is not reversed, this implies that only a portion of the sphere of directions is covered. Thus, K is certainly zero. In the most common present art toroidal magnetic confinement systems, namely the tokamak and stellarators families, the toroidal field greatly exceeds the poloidal field; thus the toroidal field does not change sign, and therefore non-zero homotopic invariants cannot be obtained. In relaxation devices, such as the RFP, toroidal field strength is comparable to its poloidal counterpart, and can have a large variation across flux surfaces. Thus, in the topomak the toroidal field can be reversed at the separatrix, yielding the invariant.

To strictly ensure the conservation of the homotopic invariant, it is required to prevent the possibility of null point occurrence, in particular at the poloidal null, and on the axis (as present in spheromak). For this reason, it is advantageous to operate the present invention with the geometric and current/field ratio parameters, such that the toroidal field reversal takes place well inside the separatrix surface. This implies a substantial axial current. Too high a current may, however, lead to a defavorable energy balance, due to heat dissipation along the open field lines, and it may as well reduce efficiency of transfer of helicity from the shaft region. The position of reversal within separatrix may be varied to obtain best plasma confinement and most efficient energy balance by experimental measurement.

The present invention therefore provides a method for generating and maintaining magnetically torroidal plasma of the Reversed-Field-Pinch type with an inner poloidal divertor and without linking coils, by means of inserting a topological constraint. Having a RFP without linking coils is not possible in prior art RFP configurations. The present invention closely approximates a high energy Taylor state. The location of the topological invariant according to the present invention is such as to exert a stabilizing influence on global instabilities preventing decay to lower energy Taylor states with unfavourable magnetic shear, or to total reconnection to open field-lines. The location of the poloidal divertor implied by the invariant is also favorable for the amelioration of effects arising from the increased magnetic shear near the separatrix, as well as for effective impurity cure. Therefore, advantages of greater stability and/or greater $\beta$, generically termed improved plasma confinement, as well as technical advantages, specific to reacotor embodiment, may be expected compared with prior art RFP and spheromak devices.

While the novel aspects of a magnetic confinement plasma device in accordance with the present invention have been shown in a preferred embodiment, many modifications and variations may be made therein within the scope of the invention, as in the size, shape, and current and field intensities, as well as in application of alternate methods and techniques well known in the art of plasma and fusion. For example, the axial current in the shaft region may be produced by other means than electrodes, as used in other devices for helicity injection. This includes electron beam injection along the open field lines. This includes also the possibility that the open-ended cylindrical vessel described in the invention may be an approximation of a larger closed toroidal vessel, in which case the axial discharge may be produced by inductive coils; such vessel can include along its axis more than one configuration as described in the invention. Moreover, the intermediate plasma state reached at stage 5 of the preferred method of production described above, may be obtained by other means. These include the injection in the vessel of a plasma ring produced by a coaxial-plasma source. One would then proceed along the same subsequent steps 6 to 9, as above. Additional possible variations include the adjunction of various standard means known to improve stability, such as the introduction of a conducting bar at the major axis of the shaft region. The particular embodiment described is designed for experimental and research purposes. Scaled-up embodiments intended for the production of a fusion and power reactor will likely include various additional well-known appurtenances of plasma and fusion devices, such as power supplies, vacuum pumps, instrumentation, auxiliary heating systems, blankets, heat exchangers, supporting structures and control systems.

I claim:

1. A method for generating and confining plasma by plasma relaxation comprising:
  generating plasma;
  generating and maintaining within the plasma a magnetic field configuration having a non-zero homotopic invariant, comprising at least one region of nested toroidal magnetic surfaces defining a magnetic elliptic axis, a region of open field-lines extending along the major axis of symmetry of said at least one region of toroidal magnetic surfaces, and an open-ended divertor separatrix surface comprising a poloidal null, with toroidal magnetic orientation at said poloidal null reversed with respect to orientation of said elliptic axis of said at least one toroidal region, by passing current through the plasma in a plurality of toroidal and straight channels producing at least one toroidal reversed-field-pinch-like region and a straight z-pinch-like region along the major toroidal axis of said at least one toroidal region, producing said open-ended separatrix surface with said poloidal null, part of said separatrix surface enclosing said at least one toroidal channel, said open-ended separatrix surface being surrounded by an additional set of nested, open field-lines, cylindrical magnetic surfaces within the plasma; and
  forming within said plasma at least one region of nested toroidal surfaces wherein the safety factor q changes sign and attains for both signs absolute values different from zero but substantially in all said region less than 1.

2. The method of claim 1 wherein said step of generating a non-zero homotopic magnetic invariant is characterized in that the component of magnetic field on said open-ended separatrix in the toroidal direction defined by said elliptic axis, is different from zero and of reversed direction with respect to the direction of said elliptic axis of said toroidal region.

3. The method of claim 1 wherein said step of maintaining a non-zero homotopic magnetic invariant includes making the component of magnetic field, in direction of said major axis of symmetry of said at least one toroidal region, different from zero, in the vicinity of the outer boundary of said additional set of outer cylindrical open-field lines surfaces and with same sign everywhere in said vicinity of the outer boundary.

4. The method according to claim 1, wherein said at least one region of nested toroidal magnetic surfaces within said open-ended divertor separatrix surface, is bound internally by a plurality of respective separatrix surfaces surrounding respective toroidal regions, said at least one elliptic axis lying within respective toroidal regions, and wherein said step of forming a non-zero homotopic invariant includes making magnetic field in the direction of at least one elliptic axis in reverse direction on said open-ended divertor.

5. The method of claim 1 wherein said poloidal null of said divertor separatrix is situated in the nearmost region to said major axis of symmetry on the small-major-radius side of said toroidal region.

6. The method of claim 1 wherein the toroidal component of magnetic field at said poloidal null of said open-ended separatrix is substantially different from zero.

7. The method of claim 5 wherein said channels are shaped, positioned and maintained by external means.

8. The method of claim 4 where said channels are shaped, positioned and maintained by external means.

9. The method of claim 2 where said channels are shaped, positioned and maintained by external means.

10. The method of claim 1 where said channels are shaped, positioned and maintained by external means.

11. Apparatus for generating and confining plasma, by constrained plasma relaxation, comprising:
  means for generating and maintaining within the plasma a magnetic field configuration having a non-zero homotopic invariant, comprising at least one region of nested toroidal magnetic surfaces defining a magnetic elliptic axis, a region of open field-lines extending along the major axis of symmetry of said at least one region of toroidal magnetic surfaces, and an open-ended divertor separatrix surface comprising a poloidal null with toroidal magnetic orientation at said poloidal null reversed with respect to orientation of said elliptic axis of said at least one toroidal region, by passing current through the plasma in a plurality of toroidal and straight channels producing at least one toroidal reversed-field-pinch-like region and a straight z-pinch-like region along the major toroidal axis of said at least one toroidal region, producing said open-ended separatrix surface with said poloidal null part of said separatrix surface enclosing said at least one toroidal channel, said open-ended separatrix surface being surrounded by an additional set of nested, open field-lines, cylindrical magnetic surfaces within the plasma; and
  means for forming within said plasma at least one region of nested toroidal surfaces wherein the safety factor q changes sign and attains for both signs absolute values different from zero but substantially in all said region less than 1.

12. Apparatus of claim 11 including wall means defining a chamber for containing said plasma, said wall means being spaced from said plasma channels.

13. Apparatus of claim 12 wherein said chamber and one of said channels have cylindrical topology.

14. Apparatus of claim 13 additionally including at least one toroidal channel.

15. Apparatus of claim 13 wherein said chamber and channels are axisymmetric about the cylindrical axis of said chamber.

16. Apparatus of claim 11 including means external to the plasma for shaping, positioning and sustaining said channels.

17. Apparatus of claim 16 wherein said means for shaping, positioning and sustaining include an electrically conducting shell of the shape desired for said plasma.

18. Apparatus of claim 16 wherein said means for shaping, positioning and sustaining include fields shaping coils.

19. Apparatus of claim 11 wherein said means for passing current include induction coils dispposed external to the plasma for inducing said currents and distributed for shaping, and sustaining said currents.

20. Apparatus of claim 19 additionally including electrodes discharging and passing current through said plasma.

21. Apparatus of claim 11 wherein said means for generating a non-zero homotopic invariant include means for making the component of magnetic field on said open-ended separatrix, in the toroidal direction defined by said elliptic axis, different from zero and of reversed direction with respect to the direction of said elliptic axis of said toroidal region.

22. Apparatus of claim 16 wherein said means for generating a non-zero homotopic magnetic invariant include means for making the component of magnetic field on said open-ended separatrix, in the toroidal direction defined by said elliptic axis, different from zero and of reversed direction with respect to the direction of said elliptic axis of said toroidal region.

23. Apparatus of claim 11 wherein said at least one region of nested toroidal magnetic surfaces within said open-ended divertor separatrix surface, is bound internally by a plurality of respective separatrix surfaces surrounding respective toroidal regions, said at least one elliptic axis lying within respective toroidal regions, said apparatus including means for making magnetic field in the direction of at least one elliptic axis in reverse direction on said open-ended divertor.

24. Apparatus of claim 16 wherein said at least one region of nested toroidal magnetic surfaces within said open-ended divertor separatrix surface, is bound internally by a plurality of respective separatrix surfaces surrounding respective toroidal regions, said at least one elliptic axis lying within respective toroidal regions, said apparatus including means for making magnetic field in the direction of at least one elliptic axis in reverse direction on said open-ended divertor.

* * * * *

UNITED STATES PATENT AND TRADEMARK OFFICE
CERTIFICATE OF CORRECTION

PATENT NO.   :   5,147,596
DATED        :   September 15, 1992
INVENTOR(S)  :   Daniel Weil It is certified that error appears in the above-identified patent and that said Letters Patent is hereby corrected as shown below:

On the title page: Item

[73] Should read as follows:

Assignees: Israel Atomic Energy Commission, Tel Aviv, Israel
and
Laboratory of Ionised Gases, The Hebrew University of Jerusalem, Jerusalem, Israel Signed and Sealed this Twenty-second Day of March, 1994

Attest:

BRUCE LEHMAN

Attesting Officer        Commissioner of Patents and Trademarks